(No Model.)

F. RHIND.
LAMP.

No. 342,463.  Patented May 25, 1886.

Witnesses
Chas. H. Smith
J. Stail

Inventor
Frank Rhind
per Lemuel W. Serrell
att.

UNITED STATES PATENT OFFICE.

FRANK RHIND, OF BROOKLYN, ASSIGNOR TO HIMSELF, AND CHARLES STANFORD UPTON, OF NEW YORK, N. Y.

LAMP.

SPECIFICATION forming part of Letters Patent No. 342,463, dated May 25, 1886.

Application filed February 10, 1886. Serial No. 191,411. (No model.)

*To all whom it may concern:*

Be it known that I, FRANK RHIND, of Brooklyn, in the county of Kings and State of New York, have invented an Improvement in Lamps, of which the following is a specification.

My invention consists in the combination, in a lamp, of a central air-tube, a reservoir composed of an open-bottom glass vessel and a metallic septum connected to the air-tube and forming the bottom, and having metallic rims at each side of the lower edge of the glass vessel, and cement that is proof against the action of kerosene filling the groove between the rims and securing the glass, and I provide stays that extend from the lower end of the air-tube to the inner part of a metal base, for securely holding the air-tube in its central position.

Figure 1:
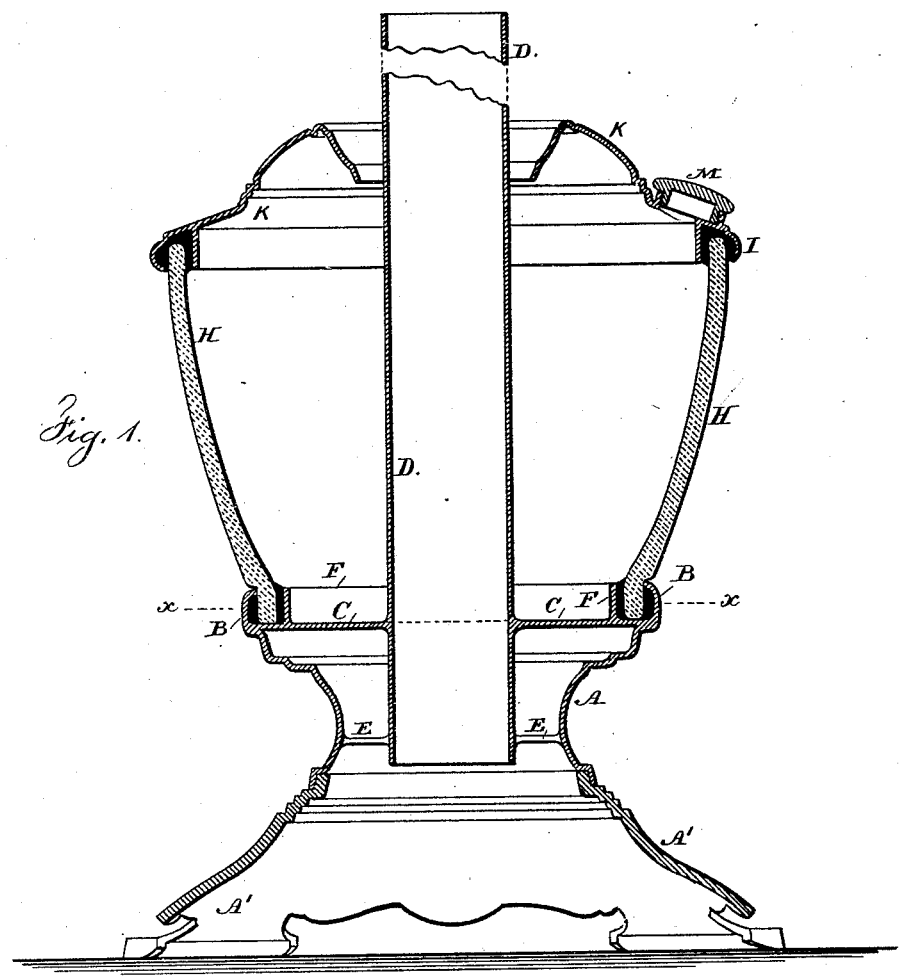
Figure 2:
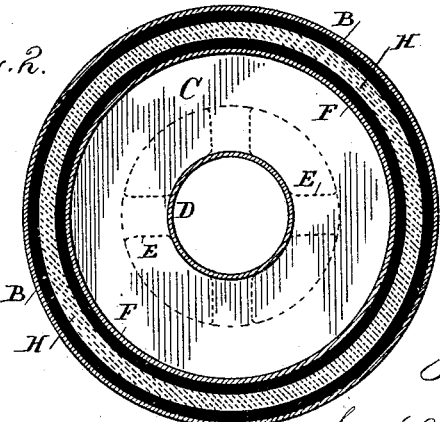

In the drawings, Figure 1 is a vertical section of the lamp reservoir and base, and Fig. 2 is a horizontal plan at the line $x\,x$.

The base A of the lamp is of sheet metal stamped up to the desired ornamental shape and hollow, and it terminates at the upper end in a rim, B, and within the base and below the rim B is a septum, C, through which the air-tube D passes and is secured by solder. The edges of the septum are also secured by solder around the base of the rim B. The lower end of the air-tube D is stayed by the disk or braces E, that extend to the interior of the lamp-base A.

Upon the septum C there is a rim, F, leaving a space between the same and the rim B sufficient for the reception of the lower end of the glass reservoir H and the cement by which the same is fastened into place.

The cement which I make use of, and which I find is proof against the action of kerosene, and adheres firmly to both the glass and the metal and consolidates into a very hard and strong mass, is composed of litharge and glycerine worked up into a stiff paste.

The top K of the lamp-reservoir is made of sheet metal with a rim, I, within which the upper edge of the glass reservoir is received, and in this top K there is a screw neck and plug, M, that is removable for filling.

By making use of a septum between the cemented joint and the air-tube there is no risk of the cement being unduly strained or cracked by the expansion or heat of the lamp, and the air-tube is held in a central position to the other parts of the lamp, or can be adjusted, if necessary, after the reservoir is cemented in place, because the septum will yield slightly without injury to the cement, and the stays E securely hold the air-tube in its central position when adjusted.

The sheet-metal base A may have feet or other means of support formed in one with said base A; or said base A may be secured to a cast-metal support, A', as shown in Fig. 1.

I do not claim a glass reservoir, nor the combination of a glass reservoir set into a metallic holder with a central air-tube; neither do I claim two glass reservoirs, one within the other, or a reservoir with the bottom closely surrounding a central air-tube, as these have before been made.

I claim as my invention—

1. The combination, with the central air-tube, of a reservoir composed of an open-bottomed glass vessel and a metallic septum connected to the air-tube and forming the bottom, and having metallic rims at each side of the lower edge of the glass vessel, and cement that is proof against the action of kerosene filling the groove between the rims and securing the glass, substantially as set forth.

2. The combination, with a glass reservoir, of a metal base having a rim within which the glass reservoir is secured by cement that is proof against the action of kerosene, a septum within the base, an air-tube passing through the septum and soldered to the same, and stays extending from the lower end of the air-tube to the inner part of the base, substantially as set forth.

Signed by me this 28th day of January, A. D. 1886.

FRANK RHIND.

Witnesses:
 GEO. T. PINCKNEY,
 WILLIAM G. MOTT.